US007040188B2

(12) United States Patent
Ootsuka

(10) Patent No.: US 7,040,188 B2
(45) Date of Patent: May 9, 2006

(54) FITTING STRUCTURE OF AUTOMATIC TRANSMISSION

(75) Inventor: Shinya Ootsuka, Shizuoka (JP)

(73) Assignee: Jatco LTD, Fuji (JP)

( * ) Notice: Subject to any disclaimer, the term of this patent is extended or adjusted under 35 U.S.C. 154(b) by 154 days.

(21) Appl. No.: 10/419,950

(22) Filed: Apr. 22, 2003

(65) Prior Publication Data

US 2003/0200832 A1 Oct. 30, 2003

(30) Foreign Application Priority Data

Apr. 25, 2002 (JP) ............................ 2002-124729

(51) Int. Cl.
*F16H 37/08* (2006.01)

(52) U.S. Cl. .................................................... 74/421 R

(58) Field of Classification Search .............. 74/421 A, 74/421 R, 606 R; 475/231; 192/3.29, 3.3
See application file for complete search history.

(56) References Cited

U.S. PATENT DOCUMENTS 5,152,190 A * 10/1992 Jurgens et al. ............ 74/606 R
5,188,575 A * 2/1993 Leising et al. .............. 475/280
5,483,850 A * 1/1996 Yamauchi ................. 74/606 R
5,775,177 A * 7/1998 Ikeda ....................... 74/606 R
6,408,718 B1 * 6/2002 Nogle ...................... 74/606 R

FOREIGN PATENT DOCUMENTS

JP 11-294555 A 10/1999

* cited by examiner

*Primary Examiner*—Vicky A. Johnson
(74) *Attorney, Agent, or Firm*—Foley & Lardner LLP

(57) ABSTRACT

A fitting structure of an automatic transmission includes a cylindrical fitting member and a receiving member. The fitting member includes a fitting portion that is substantially received in an opening portion of the receiving member. A diameter of a lead end of the fitting portion is larger than a diameter of a rear end thereof. A difference between the diameters of the lead end and the rear end are within an elastic deformation range of the receiving member. A tightening force is created after fitting to hold the fitting member securely. An entire circumference of an edge portion of the lead end of the fitting member is formed with a predetermined curvature.

13 Claims, 3 Drawing Sheets

4
42
7
41
74
71a
71
71b
73
72
Tsinθ
Tcosθ
θ
θ
TIGHTENING FORCE T
DUE TO ELASTIC DEFORMATION

FITTING STRUCTURE OF AUTOMATIC TRANSMISSION

BACKGROUND OF THE INVENTION

The present invention relates to a fitting structure of an automatic transmission, in particular, it relates to a fitting structure of an oil pump cover and a stator shaft.

Japanese Patent Provisional Publication (Heisei) 11-294555 discloses a fitting structure of an automatic transmission. This fitting structure is for use when press-fitting a stator shaft into an inner circumference of an oil pump cover. The stator shaft comprises serrated large-diameter portion for serration-fitting with the oil pump cover, and a small-diameter portion for press-fitting with the oil pump cover.

SUMMARY OF THE INVENTION

However, although superior fitting force can be achieved to counter torque acting circumferentially about the axis with the above related art, there is still the problem with ample fitting force not being achieved to counter torque acting in the axial direction.

In the related art, a stator shaft passes through an oil pump cover, a one-way clutch of a torque converter being fixedly supported at one end thereof, and a drum or similar rotating body being revolvingly supported at another end thereof. In an instance where a torque converter comprises a lockup clutch, a lockup piston slides axially accompanying engagement and disengagement of the lockup clutch. Thrust force due to this axial sliding is input into the one-way clutch via thrust bearings and other elements, and also adversely acts on the stator shaft axially. As the oil pump cover is fixed to the transmission case, there may also be a lack of fitting force to firmly hold the stator shaft. This would allow undesirable vibratory motion when torque acts axially in both the direction in which the stator shaft has been press-fit and the opposite direction.

Also, a plurality of hydraulic passages are disposed in the oil pump cover for supplying hydraulic pressure from a control valve unit to various elements including individual friction elements. Hydraulic pressure is supplied via the hydraulic passages within the stator shaft to other areas including passages within various shafts. If the positioning of the oil pump cover and the stator shaft fall out of alignment due to vibratory motion, it is possible for line resistance to become unfavorably large, thereby degrading the ability to control the hydraulic pressure.

SUMMARY

An object of the present invention is to provide a fitting structure of an automatic transmission, which fitting structure is capable of securely holding a stator shaft without the occurrence of vibratory motion, not only with respect to a torque acting circumferentially about the shaft but also with respect to a torque that is input and acting in the axial direction.

An aspect of the present invention resides in a fitting structure of an automatic transmission, the fitting structure comprising a fitting member which is cylindrical, a diameter of a lead end thereof being larger than a diameter of a rear end thereof, and a receiving member comprising an opening portion to be fit with the fitting member, the receiving member being formed from a material of less rigidity than the fitting member.

Another aspect of the present invention resides in a fitting structure of an automatic transmission, the fitting structure comprising a fitting member comprising a fitting portion which is cylindrical, the fitting portion being formed in a tapering shape and a receiving member comprising an opening portion to be fit with the fitting portion, the receiving member being formed from a material of less rigidity than the fitting member.

A further aspect of the present invention resides in an assembly of an automatic transmission, the assembly comprising a fitting member comprising a fitting portion which is cylindrical, and a receiving member comprising an opening portion into which the fitting portion is fit, being formed from a material of greater elastic deformation than the fitting member, wherein a diameter of a lead end of the fitting portion being greater than a diameter of a rear end of the fitting portion, a difference between the diameters being within an elastic deformation range of the receiving member, a diameter of the opening portion of the receiving member being smaller than a diameter of the fitting portion, a tightening force being created in the receiving member by elastic deformation thereof after fitting of the fitting member into the receiving member for holding the fitting member, and an edge portion of the lead end of the fitting portion being formed with a predetermined curvature.

The other objects and features of this invention will become understood from the following description with reference to the accompanying drawings.

DETAILED DESCRIPTION

With respect to FIGS. 1 through 3B, there is discussed an embodiment of a fitting structure of an automatic transmission in accordance with the present invention.

Figure 1:
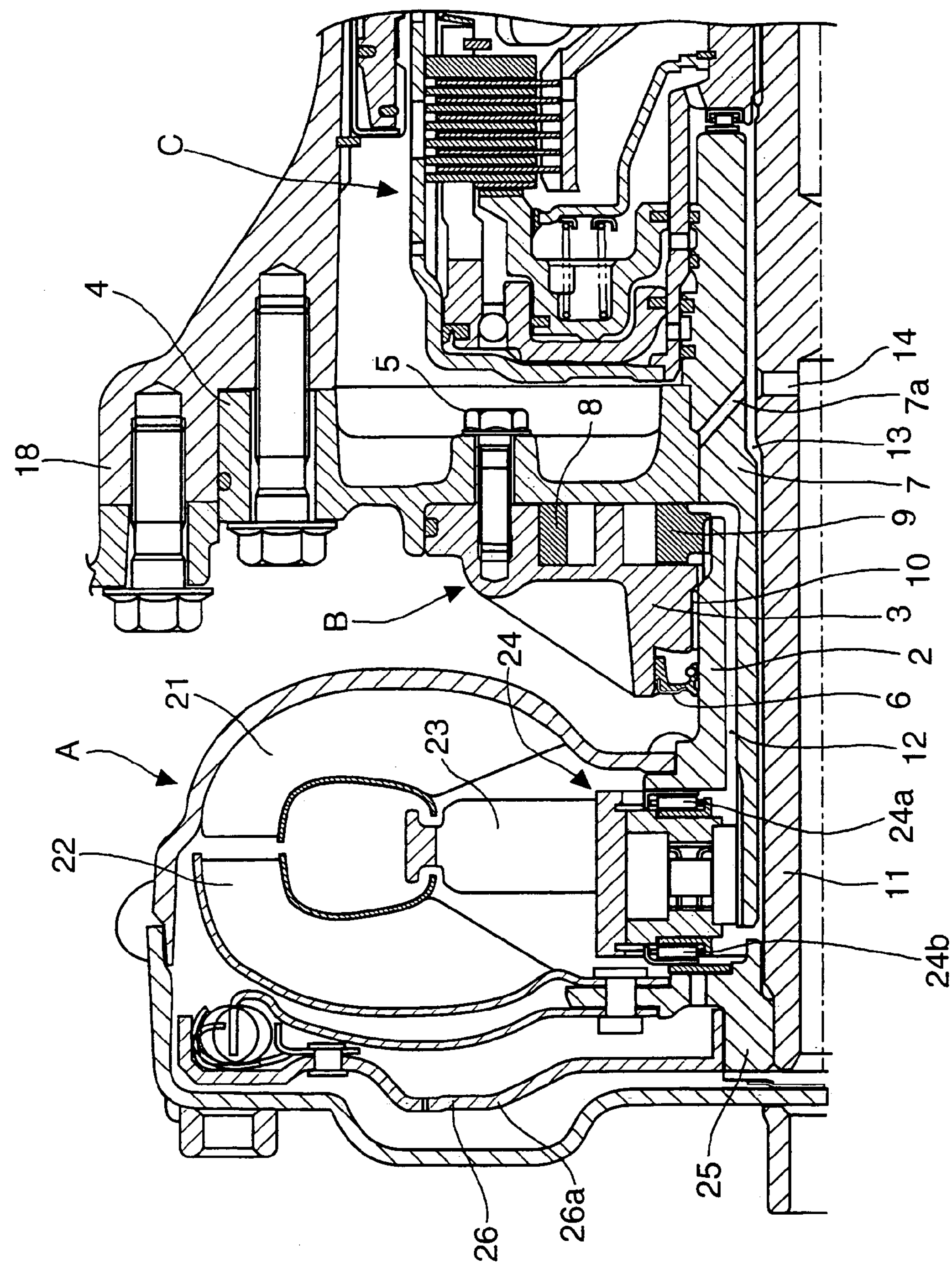
FIG. 1 is a cross-sectional view showing an automatic transmission comprising a fitting structure according to an embodiment of the present invention.
Figure 2:
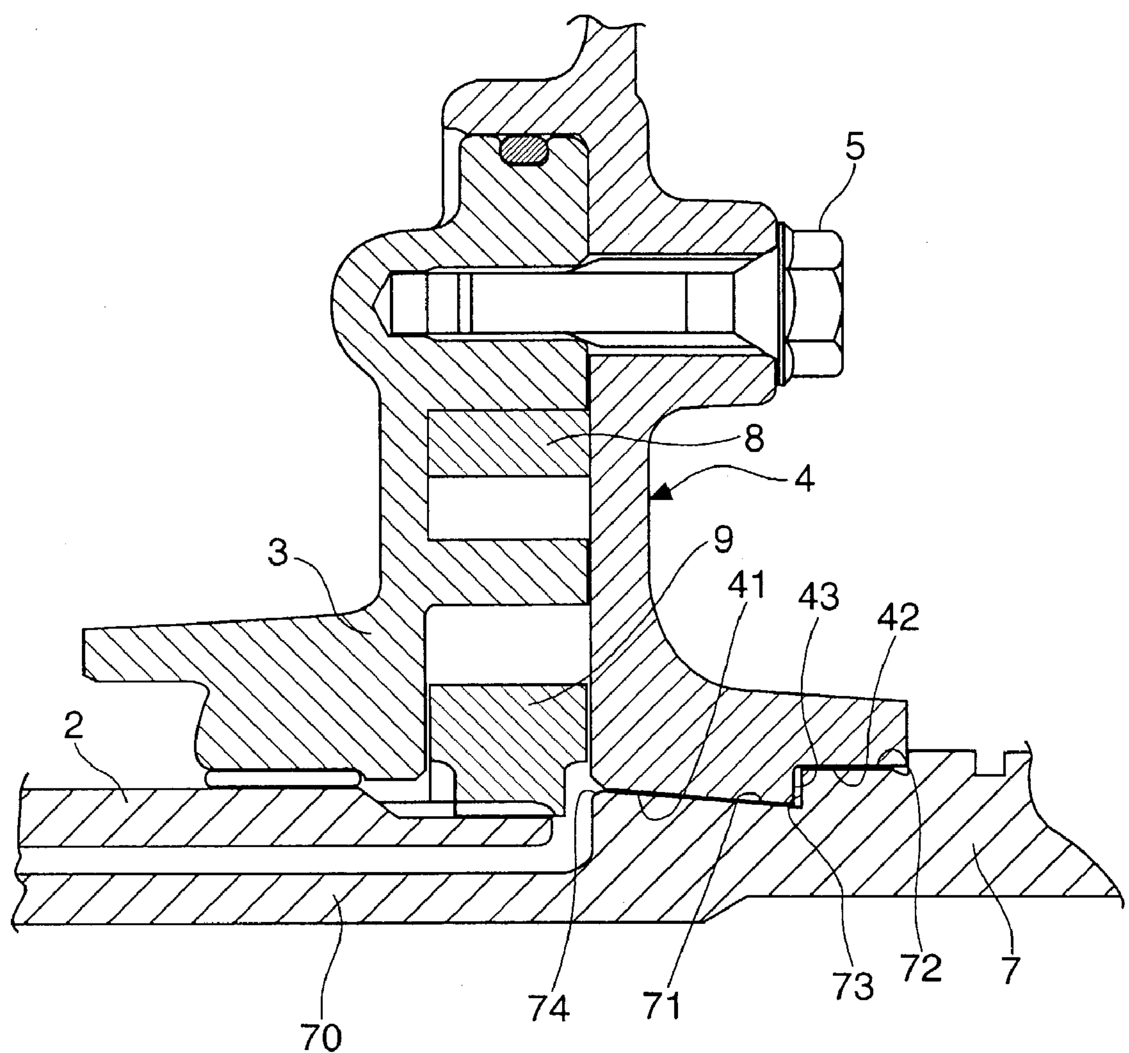
FIG. 2 is an enlarged cross-sectional view showing an oil pump cover and a stator shaft of the automatic transmission FIG. 1.

An oil pump B is disposed between a torque converter A and a transmission apparatus C as shown in FIG. 1. An impeller 21 of the torque converter A and an oil pump drive shaft 2 of the transmission apparatus C revolve together with an engine output shaft. The oil pump B comprises an inner gear 9 that is joined with the oil pump drive shaft 2.

A body of the oil pump B is constructed with an oil pump housing 3, an oil pump cover 4, and a stator shaft 7. The oil pump cover 4 is fixed to a transmission case 18 by bolts. The oil pump housing 3 and the oil pump cover 4 are fixed by clamp bolts 5. Within the oil pump cover 4 an outer gear 8 is disposed on an outer circumference of an inner gear 9. An oil seal 6 and a bushing 10 are disposed between the oil pump housing 3 and the oil pump drive shaft 2. The oil pump cover 4 and the stator shaft 7 are fitted together through serration fitting and press-fitting.

Passages (including an intermediate passage 7*a*). which are disposed within the oil pump cover 4 and the stator shaft 7, supply hydraulic control pressure from a control valve unit (not shown) to each hydraulic passage. The passages include: (a) a torque-converter pressure supply passage 12, (b) a torque converter pressure drain passage 13, and (c) a lockup clutch pressure supply passage 14.

The torque converter A comprises: (a) an impeller 21 that is coupled directly to an engine (not shown), (b) a turbine 22, (c) a stator 23, and (d) a lockup clutch 26 that directly connects the engine and a shaft 11. The stator 23 is fixedly supported by the stator shaft 7 through a one-way clutch 24. Thrust bearings 24*a* and 24*b* are disposed at both sides axially of the one-way clutch 24 so that a turbine hub 25 and the oil pump drive shaft 2 are rotatably supported with respect to the one-way clutch 24.

The left end of the shaft 11 shown in FIG. 1 is splined and is inserted into the turbine hub 25, which supports the lockup clutch 26 and the turbine 22 of the torque converter A. The state of the connection between the engine and the shaft 11 is controlled by a lockup piston 26*a* of the lockup clutch 26, which lockup piston 26 axially slides along an outer circumference of the turbine hub 25.

The torque converter pressure drain passage 13 is disposed between the shaft 11 and the stator shaft 7. Hydraulic passages, which run within shafts such as the lockup clutch pressure supply passage 14, are disposed in the shaft 11. The hydraulic passages supply hydraulic pressure from the intermediate passage 7*a* to the lockup clutch 26.

The stator shaft 7 is formed from a ferroalloy and is designed to have a minimal thickness, while maintaining necessary strength to withstand torque input from the one-way clutch 24 or a similar element, in order to strive for compactness of the entire structure. With respect to FIG. 2, the stator shaft 7 comprises: (a) a shaft portion 70 that is of small diameter and that fixedly supports the one-way clutch 24 of the torque converter A, (b) a press-fitting portion 71 that is of mid-diameter and that press-fits with the oil pump cover 4, and (c) a serration portion 72 that is of large diameter and that serration-fits with the oil pump cover 4. A stopper surface 73, which is formed at the boundary of the press-fitting portion 71 and the serration portion 72, prohibits axial movement of the stator shaft 7 toward the torque converter A.

The oil pump cover 4 is formed from an aluminum alloy, to allow for a minimum weight, while maintaining necessary thickness. The oil pump cover 4 comprises: (a) a cover press-fitting portion 41 for press-fitting with the press-fitting portion 71 of the stator shaft 7, and (b) a cover serration portion 42 for serration fitting with the serration portion 72 of the stator shaft 7. A cover stopper surface 43, which is formed at the boundary of the cover press-fitting portion 41 and the cover serration portion 42, is configured to abut with the stopper surface 73 of the stator shaft 7.

Figure 3A:
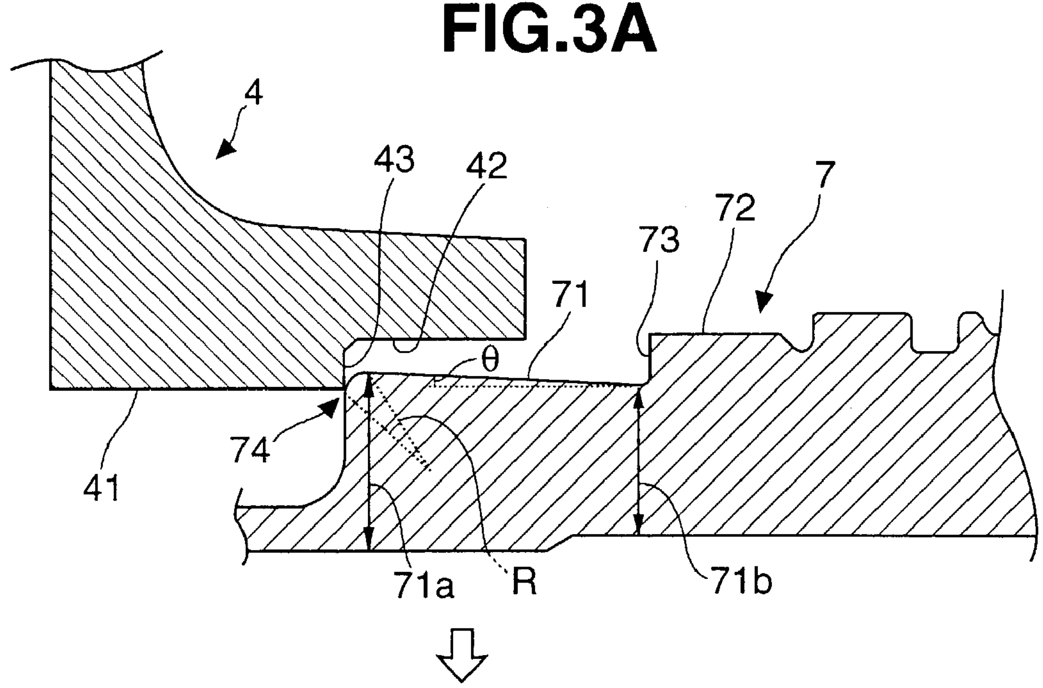
FIG. 3A is an enlarged cross-sectional view of the fitting structure in FIG. 2.

The process of press fitting the oil pump cover 4 with the stator shaft 7 will now be explained. As shown in FIG. 3A, the press-fitting portion 71 comprises a lead end 71*a* and a rear end 71*b*. A diameter of the lead end 71*a* is larger than a diameter of the rear end 71*b*. A tapering surface, which has an angle θ, is thereby formed on the press-fitting portion 71. An inner diameter of the cover fitting portion 41 of the oil pump cover 4 is set to be smaller than an outer diameter of the stator shaft 7 at the lead end 71*a*. This requires the oil pump cover 4 to deform in order to press-fit the oil pump cover 4 and the stator shaft 7 together. The stator shaft 7, which is made of a ferroalloy, is of a greater rigidity than the oil pump cover 4, which is made of an aluminum alloy. As a result, the oil pump cover 4 will deform to be press-fit with the stator shaft 7. Further, a difference between the diameter of the rear end 71*b* and the diameter of the lead end 71*a* of the press-fitting portion 71 is set to be within an elastic deformation range of oil pump cover 4, that is, the oil pump cover 4 deforms during press fitting to fit over the stator shaft 7, within a limit in which the oil pump cover 4 retains an elastic property.

As shown in FIG. 3A, the press-fitting portion 71 comprises a lead edge 74, which is chamfered and which has a predetermined radius of curvature R (taken in a cross-section axially of the press-fitting portion 71). The lead edge 74 is chamfered about an entire circumference thereof. When the stator shaft 7 is press-fitted into the oil pump cover 4, initially a press-fitting stress created by press-fitting the oil pump cover 4 over the lead edge 74 works in a direction to stretch the cover press-fitting portion 41 diametrically and to enlarge an inner circumference thereof. The press-fitting is carried out in this manner, while the stretched oil pump cover 4 deforms within the elastic deformation range.

Figure 3B:
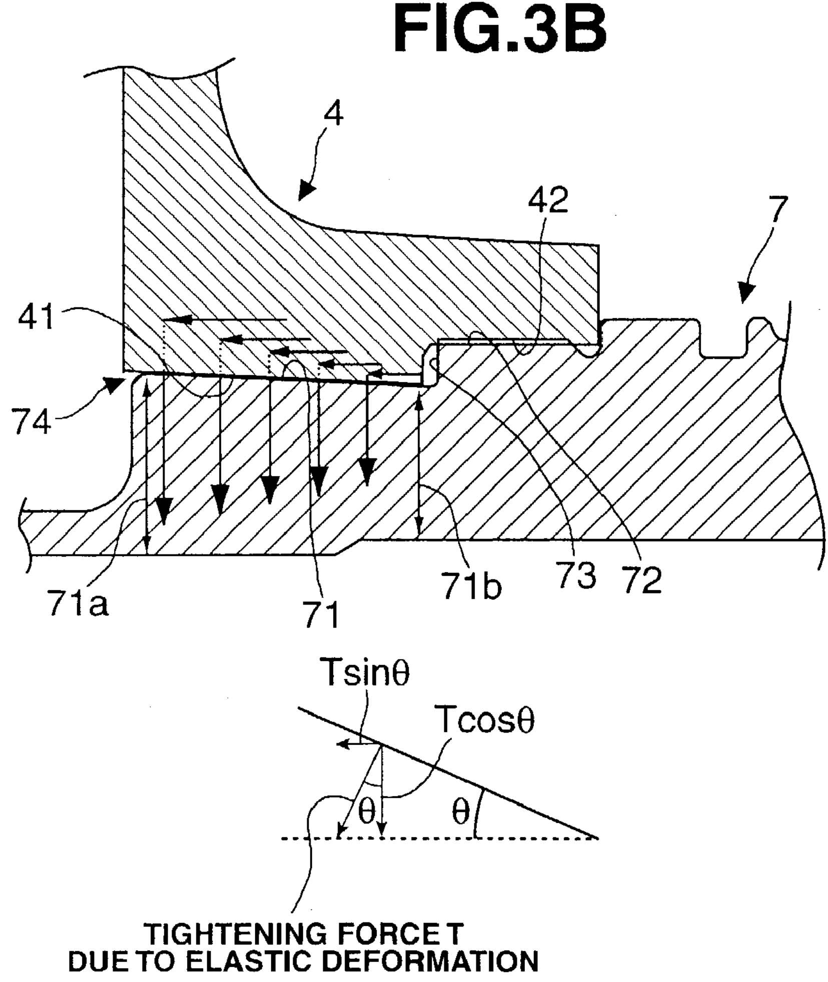
FIG. 3B is an enlarged cross-sectional view showing the fitting structure in FIG. 3A after press-fitting.

The stress distribution after the press-fitting can be seen from FIG. 3B. A fitting surface area indicated by the arrows is formed along the tapering surface of the press-fitting portion 71 of the stator shaft 7 by the cover press-fitting portion 41 that deforms within the elastic deformation range. When a tightening force T created by the elastic deformation of the cover press-fitting portion 41 acts on this fitting surface area, a force defined by $T\cos\theta$, which acts in an inward diametrical direction, and a force defined by $T\sin\theta$, which acts in the axial direction toward the torque converter A, are created. Therefore, even if a load acts on the stator shaft 7 in a direction to the right of FIG. 3B in which the stator shaft 7 would typically try to dislodge from the oil pump cover 4, it is possible to gain a diametrical component of load, as shown by the dotted lines that extend diametrically from the arrows in the axial direction in FIG. 3B. Thus, it is possible to disperse a load that is opposite to the frictional force of the fitting surface generated by the tightening force due to the elastic deformation of the oil pump cover 4. Moreover, it is possible to achieve an improvement of the holding force, which firmly holds the press-fitted member.

It is possible to tighten the entirety of the press-fitting portion 71 (through the elastic force) by setting the inner diameter of the cover press-fitting portion 41 of the oil pump cover 4 to be smaller than the diameter of the stator shaft 7 at the rear end 71*b*.

The difference between the diameter of the lead end 71*a* and the diameter of the rear end 71*b* is set to be within the elastic deformation range of the oil pump cover 4. Therefore, it is further possible to achieve an improvement in the holding force, while avoiding the problem of plastic deformation of the oil pump cover 4 in which the elastic force would be lost and would, therefore, result in an inability to achieve ample tightening force.

As the entire circumference of the edge portion of the lead end 71*a* of the press-fitting portion 71 is chamfered and has a predetermined radius of curvature R (taken in a cross-section axially of the press-fitting portion 71), it is easy for the press-fitting stress to work in a direction to stretch the cover press-fitting portion 41 of the oil pump cover 4 in the diametrical direction during press fitting. As a result, it is possible to reduce load during press-fitting.

A plurality of hydraulic passages, which are disposed within the oil pump cover 4, supply hydraulic pressure to passages within various shafts, e.g., the lockup clutch pressure supply passage 14, which is disposed in shaft 11. Thus, the hydraulic passages of the oil pump B are linked with the lockup clutch pressure supply passage 14 via the intermediate passage 7*a* that is disposed in the stator shaft 7. The one-way clutch 24 is fixedly supported on the stator shaft 7 such that a load acts axially, accompanying the engagement and disengagement of the lockup clutch 26 via elements including the thrust bearings 24*a* and 24*b*. If the portion where the oil pump cover 4 and the stator shaft 7 mutually fit falls out of alignment (due to this load) a resistance between the hydraulic passages of the oil pump B and the hydraulic passages within the shafts may typically become unfavorably large, thereby inviting a possible degradation of the ability to control the hydraulic pressure. However, by applying the fitting structure of the present embodiment, it is possible to ensure proper fitting, thereby preventing elements from falling out of alignment as well as preventing vibratory motion, which may otherwise arise from the load acting in the axial direction. Therefore, the degradation in the ability to control the hydraulic pressure is eliminated.

This application is based on a prior Japanese Patent Application No. 2002-124729, which was filed Apr. 25, 2002. The entire contents of Japanese Patent Application No. 2002-124729 are hereby incorporated by reference.

Although the invention has been previously described by reference to certain embodiments of the invention, the invention is not limited to these embodiments. Modifications and variations of the previously described embodiments will occur to those skilled in the art in light of the above teachings. For example, it is possible to achieve similar effects with the present embodiment applied to other fitting portions. Only the stator shaft was designed with a tapering surface in the first embodiment, however, it would also be possible to increase the fitting force further by forming a tapering surface on the oil pump cover. The scope of the invention is only to be defined with reference to the following claims and their equivalents.

What is claimed is:

1. A fitting structure of an automatic transmission, the fitting structure comprising:

a fitting member of a cylindrical shape comprising a fitting portion, wherein a diameter of a lead end of the fitting portion is larger than a diameter of a rear end of the fitting portion; and a receiving member comprising an opening portion that engages substantially all of the fitting portion, wherein the receiving member is formed from a material of less rigidity than the fitting member.

2. The fitting structure as claimed in claim 1, wherein the receiving portion is elastically deformable within an elastic deformation range, and wherein a difference between the diameters of the lead end and the rear end of the fitting portion is within the elastic deformation range.

3. The fitting structure as claimed in claim 2, wherein a tightening force is created in the receiving member by the elastic deformation thereof after fitting the fitting portion into the receiving member.

4. The fitting structure as claimed in claim 1, wherein a diameter of the opening portion of the receiving member is smaller than a diameter of the fitting portion.

5. The fitting structure as claimed in claim 4, wherein an entire circumference of an edge portion of the lead end of the fitting portion is chamfered.

6. The fitting structure as claimed in claim 5, wherein the edge portion of the lead end of the fitting portion has a predetermined curvature.

7. The fitting structure as claimed in claim 1, wherein the fitting portion is a stator shaft that rotatably supports an input shaft of an automatic transmission, and wherein the receiving member is an oil pump cover disposed within the automatic transmission.

8. The fining structure as claimed in claim 7, wherein the stator shaft is made of a ferroalloy, and wherein the oil pump cover is made of an aluminum alloy.

9. A fitting structure of an automatic transmission, the fitting structure comprising:

a fitting member comprising a fitting portion that is cylindrical, wherein the fitting portion is formed in a tapering shape; and a receiving member comprising an opening portion that engages substantially all of the fitting portion, wherein the receiving member is formed from a material of less rigidity than the fitting member.

10. The fitting structure as claimed in claim 9, wherein the fitting portion tapers inward from a lead end thereof to a rear end thereof.

11. The fitting structure as claimed in claim 10, wherein a diameter of the opening portion of the receiving member is smaller than a diameter of the lead end of the fitting portion of the fitting member, and wherein a tightening force is created in the receiving member by the receiving member's being stretched after fitting to tighten the fitting portion about an entirety thereof.

12. The fitting structure as claimed in claim 10, wherein an edge portion of the lead end of the fitting portion has a curvature about the entire circumference thereof defined by a predetermined radius of curvature taken in a cross-section axially of the fitting portion.

13. An assembly of an automatic transmission, the assembly comprising:

a fitting member comprising a fitting portion that is cylindrical; and a receiving member comprising an opening portion that engages substantially all of the fitting portion, wherein the receiving member is formed from a material of greater elastic deformation than the fitting member, wherein a diameter of a lead end of the fitting portion is greater than a diameter of a rear end of the fitting portion, wherein a difference between the diameters is within an elastic deformation range of the receiving member, wherein a diameter of the opening portion of the receiving member is smaller than a diameter of the fitting portion, wherein a tightening force is created in the receiving member by elastic deformation thereof after fitting of the fitting member into the receiving member, and wherein an edge portion of the lead end of the fitting portion is formed with a predetermined curvature.

* * * * *